United States Patent
Matthews et al.

[11] 3,720,217
[45] March 13, 1973

[54] FLUIDIC SYSTEMS

[75] Inventors: Robert B. Matthews, Chandler's Ford; Charles M. Fitzmaurice, Fareham, both of England

[73] Assignee: The Plessey Company Limited, Essex, England

[22] Filed: March 25, 1970

[21] Appl. No.: 22,453

[30] Foreign Application Priority Data

March 25, 1969 Great Britain.....................15,475/69

[52] U.S. Cl............................................137/05
[51] Int. Cl..........................F15c 1/12, F15c 1/16
[58] Field of Search.....................................137/81.5

[56] References Cited

UNITED STATES PATENTS

| | | | |
|---|---|---|---|
| 3,362,421 | 1/1968 | Schaeffer | 137/81.5 |
| 3,452,770 | 7/1969 | Beduhn | 137/81.5 |
| 3,538,931 | 11/1970 | Blosser, Jr. et al. | 137/81.5 |
| 3,557,810 | 1/1971 | Lomas | 137/81.5 |
| 3,570,511 | 3/1971 | Bermel | 137/81.5 |
| 3,570,514 | 3/1971 | Sutton et al. | 137/81.5 |
| 3,468,340 | 9/1969 | DiCamillo | 137/81.5 X |
| 3,488,948 | 1/1970 | Cornett et al. | 137/81.5 X |
| 3,489,181 | 1/1970 | Boothe | 137/81.5 |
| 3,490,478 | 1/1970 | DuBrueler, Jr. | 137/81.5 |
| 3,499,599 | 3/1970 | Meininger et al. | 137/81.5 X |
| 3,503,423 | 3/1970 | Edell | 137/81.5 |
| 3,508,565 | 4/1970 | Strantz | 137/81.5 |
| 3,511,576 | 5/1970 | Herbstritt et al. | 137/81.5 X |
| 3,515,030 | 6/1970 | Boothe | 137/81.5 X |
| 3,515,158 | 6/1970 | Utz | 137/81.5 |
| 3,536,085 | 10/1970 | Taplin | 137/81.5 |

*Primary Examiner*—Samuel Scott
*Attorney*—Mason, Mason & Albright

[57] ABSTRACT

A fluidic control system includes a pair of fluid restrictors connected in series whereby a tapping between them provides an output pressure which is a fraction of the input pressure. A planar jet collector gives an output which is a non-linear function of the input pressure. Thus, when both the jet collector and the orifices or restrictors are supplied with fluid from the same source then their difference in output pressures will vary as a function of input pressure. The output pressure difference is communicated to a fluidic proportional amplifier whose output pressure can be used to control the bleed valve or inlet guide vane of a gas turbine whence the input fluid pressure is derived.

7 Claims, 10 Drawing Figures

FLUIDIC SYSTEMS

The present invention relates to fluidic systems, such as fluidic position control systems, for example.

The present invention provides a fluidic control system, comprising a jet converter for controlling the ratio of input to output pressure thereacross as a function of the input pressure of a fluid stream applied to the jet converter, reference means for providing a fluid output pressure which is a fraction of said input pressure, and control means operative in response to the pressure difference between the output pressures of the reference means and the jet converter to produce an output dependent on the value of the input pressure.

The present invention further provides a fluidic position control system, comprising a jet converter and reference means both arranged for connection to a single source of fluid, said jet converter being arranged to provide a pressure drop to a stream of fluid from the fluid source passing therethrough such that the ratio of input to output pressure thereacross varies as a function of input pressure, said reference means providing an output pressure which is a fraction of the input pressure thereto, control means for providing an output in dependence upon the difference, if any, between the output pressures of said jet converter and said reference means, and feedback means for varying the pressure drop across said reference means to tend to reduce said pressure difference to zero.

Fluidic position control systems, embodying the invention will now be described, by way of example, with reference to the accompanying diagrammatic drawings in which.

Figure 1:
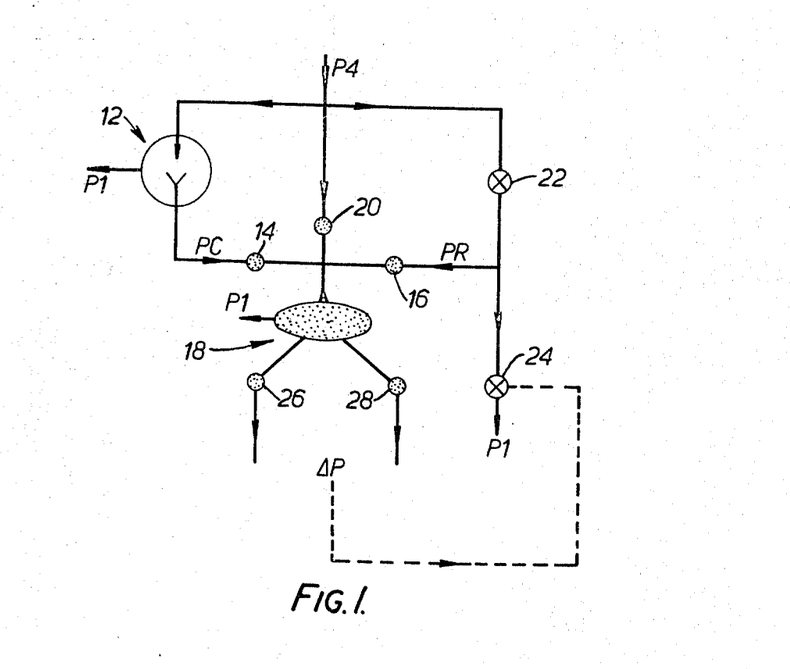
FIG. 1 is a circuit diagram of one of the fluidic position control systems.

As shown in FIG. 1 the fluidic position control system includes a pressure ratio sensor in the form of a planar jet collector 12 fed with a pressure P4 from a pressure source (not shown). The jet collector 12 has a vent output, at which the pressure P1 is substantially atmospheric.

The output pressure PC from the jet collector 12 is fed to a control jet input 14 of a proportional amplifier 18 which has an input 20 connected to receive the pressure P4 from the pressure source. The pressure source also supplies pressure reference means in the form of two orifices 22 and 24 connected in series. The upstream orifice 22 has a fixed area while the downstream orifice 24 has an area which can be varied. A tapping is taken between the two orifices to connect the pressure PR existing between the two orifices to a second control jet input 16 of the proportional amplifier 18.

The proportional amplifier 18 is provided with two output legs 26 and 28 which are supplied with fluid from the input 20, the proportion of the total fluid which passes down each leg being determined by the pressure difference which exists between the control jet inputs.

The output legs 26 and 28 of the proportional amplifiers are connected to some form of mechanical feedback which controls the area of the variable orifice 24.

The planar jet collector 12 operates such that the ratio of input to output pressure (PC/P4, known as the output pressure ratio) thereacross varies as a function of input pressure.

Figure 2:
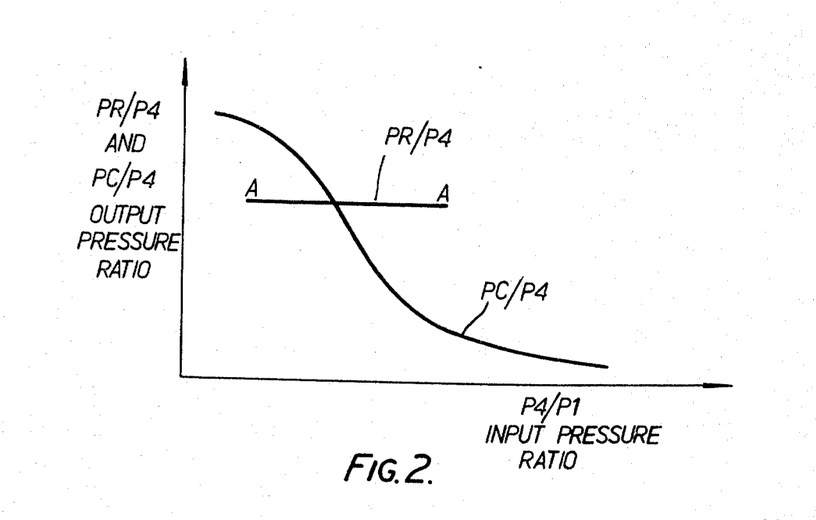
FIG. 2 is the input/output pressure ratio characteristic of the planar jet collector shown in FIG. 1.

FIG. 2 shows a graph of output pressure ratio versus input pressure ratio, the input pressure ratio being the ratio of input pressure P4 to vent pressure P1, the pressure P1 remaining substantially constant. Thus, as can be seen from the graph, the output pressure ratio PC/P4 decreases as the input pressure P4 increases.

On the other hand the pressure reference means 22, 24 is such that, provided that the reference orifices do not vary in area, the tapping pressure PR is directly proportional to the input pressure P4 as shown by the straight line A — A in FIG. 2.

Thus, the characteristics of the planar jet collector 12 and the pressure reference means, 22, 24 are different. However, the two characteristics do intersect at one point, that is for a particular predetermined input pressure P4 the output pressures PC and PR will be equal (see intersection of line A — A in FIG. 2 with the planar jet collector characteristic). When this occurs the amount of fluid passing down each output leg of the proportional amplifier 18 is the same.

Now, when the input pressure P4 varies, a pressure differential will be produced between the output pressures PC and PR which in turn will produce a pressure differential between the output legs 26 and 28 of the proportional amplifier 18. This latter pressure differential causes the drive means (not shown) to operate and to supply a feedback signal to the variable reference orifice 24. The feedback signal varies the area of the orifice 24 in such a sense that it alters the output pressure PR until it equals the output pressure PC of the planar jet collector 12. When the pressures PR and PC are equal again, the pressures in the output legs 26 and 28 of the proportional amplifier are also equal and the drive means halts in a position dependent on the new valve of P4.

Therefore, the effect of the variation in the size of the orifice 24 is to modify the relationship of PR to P4 so that, instead of PR being directly proportional to P4 as shown by the line A — A of FIG. 2, PR now follows P4 in the same manner as does PC. Hence, PR/P4 plotted against P4/P1 has the same shape as the curved characteristic of PC/P4 plotted against P4/P1. Now PR is proportional to a fraction of P4 which fraction is by virtue of the feedback loop, in turn proportional to the displacement of the drive means. Therefore, the curved characteristic of FIG. 2 can also be considered to be a plot of the displacement of the drive means against P4/P1.

In a modification the proportional amplifier 18 is provided with a reverse flow switch between each output leg and the vent area so as to divert any back flow, returning from the feedback system, along the output legs 28 and 26 into the vent area in a direction which reduces any interaction with the inlet jet of the proportional amplifier. Since the feedback system is usually such that normal flow from the inlet of the amplifier is directed predominantly down one leg (for example leg 28), balancing orifices in each of the reverse flow switches are adjusted to as to give the amplifier a greater efficiency when fluid is directed down this leg (leg 28) at the expense of the efficiency of when fluid is directed down the other leg (leg 26).

In the above-mentioned modification, it is preferable that the two let inlets in the vent area are separated by an arrow-head shaped diverter, which assists in directing any back flow away from the interaction area of the amplifier.

In a further modification, means responsive to a change in the input pressure applied to the amplifier are arranged to cause a phase lag or lead in the changing pressure in dependence upon the sense in which the pressure is changing.

Figure 3:
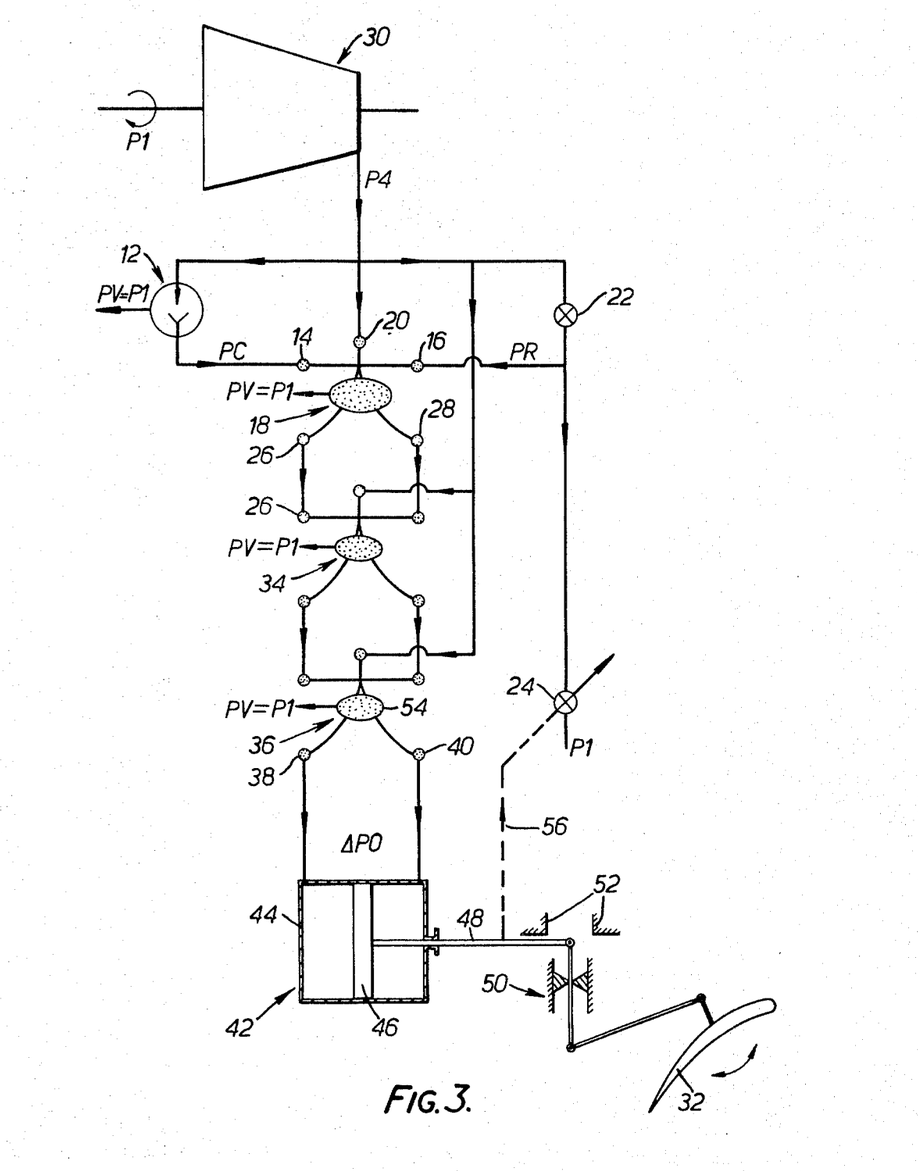
FIG. 3 is a circuit diagram of a modified form of the fluidic position control system of FIG. 1.

FIG. 3 shows an arrangement incorporating a modified fluidic position control system in which parts similar to those in FIG. 1 are similarly referenced.

The Figure shows the compressor stage 30 of a gas turbine engine. One of the difficulties arising in the compressor stage of a gas turbine engine is that if the engine is accelerated or decelerated too fast, the resultant change in output pressure P4 from the compressor, (i.e., a pressure surge) may cause the compressor to become unstable. This is undesirable and so to counter this, the compressor is provided with a variable inlet guide vane 32 which can be operated in such a way that it reduces the rate change in the value of P4 during fast acceleration and deceleration.

The rate of change in the value of P4 can be controlled by the system of FIG. 3 which represents the system of FIG. 1 suitably modified to provide a sufficient power output to operate the variable inlet guide vane 32. The modification consists in the addition of two more proportional amplifiers 34 and 36 which are connected in cascade with the amplifier 18 to amplify the fluid flow from the output legs 26 and 28 of the proportional amplifier 18. The amplifier output from the so-formed three stage amplifier is provided at the output legs 38 and 40 of the proportional amplifier 36.

FIG. 3 shows the drive means in the form of a pneumatic ram 42 which comprises a closed cylinder 44 and a movable piston 46, the output legs 38 and 40 being respectively connected to the two ends of the cylinder 44. A piston rod 48, rigid with the piston 46, is interconnected with the inlet guide vane 32 through a system of linkages 50. Two limit stops 52 are provided to limit movement of the piston 46, and thus the inlet guide vane, to within a predetermined range.

The system operates in a similar manner to that described in connection with FIG. 1. Thus the pressure P4 increases, this will cause a pressure difference across the output legs 26 and 28 of the proportional amplifier 18. This pressure difference is amplified by the proportional amplifiers 34 and 36 and the amplified pressure difference appears across the legs 38 and 40. This amplified pressure difference is applied across the ram 42 so as to drive the piston 42 to the right (as shown in FIG. 3). As the piston 42 is moved to the right, the fluid in the right hand side of the cylinder is forced back down the leg 40 and exits through a vent 54 of the proportional amplifier 36. At the same time the inlet guide vane 32 is orientated in a sense to tend to reduce the rate of increase in pressure P4, and a feedback link 56 operates the variable orifice 24 to tend to equalize the pressures PC and PR.

When the pressure P4 has ceased to increase and the pressures PC and PR eventually equalize the piston 46 becomes stationary and steady state conditions exist.

The two stops 52 are only effective when the value of the pressure P4 has exceeded a predetermined maximum or fallen below a predetermined minimum.

Figure 4:
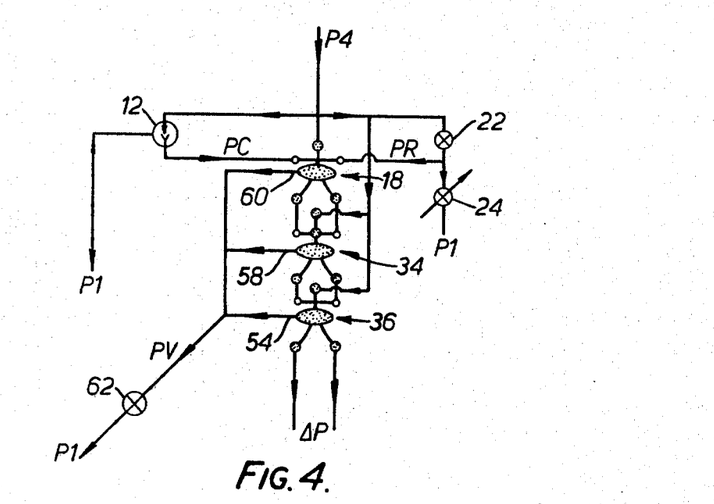
FIGS. 4 and 5 shown modifications to the circuit diagram of FIG. 3.

FIG. 4 shows a modification of the system of FIG. 3 with the compressor, the ram and inlet guide vanes omitted for the sake of clarity. The three output vents 60, 58 and 54 respectively of the three proportional amplifiers 18, 34 and 36 all communicate with the atmosphere pressure P1 through a restrictor 62 which can be varied to increase the pressure at each of the vent outputs. This has the effect of decreasing the input/output pressure ratio across each proportional amplifier.

Figure 5:
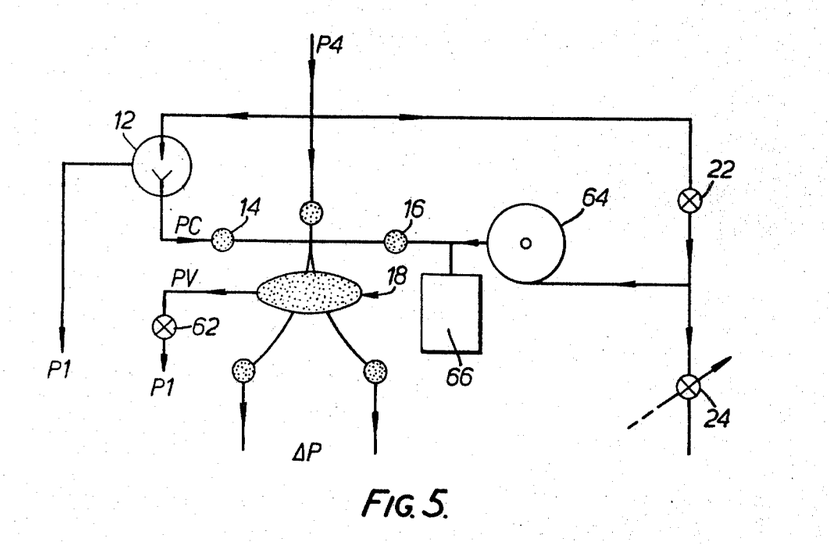

FIG. 5 shows a modification of the system of FIG. 4 in which the second and third amplifier stages have been omitted for the sake of clarity. The tapping between the two orifices 22 and 24, which communicates with the control jet input 16, incorporates a vortex diode 64 and a fluid capacitor 66. This ensures that the dynamic response for the system when the pressure P4 is increasing differs from that applicable when the pressure P4 is decreasing. Thus the inlet guide vanes are provided with the appropriate transient movement both when the compressor is accelerating and when the compressor is decelerating which movements correspond with the different requirements of the compressor under the two conditions.

A bleed valve can be used instead of the guide vane 32 to control the pressure P4.

Figure 6:
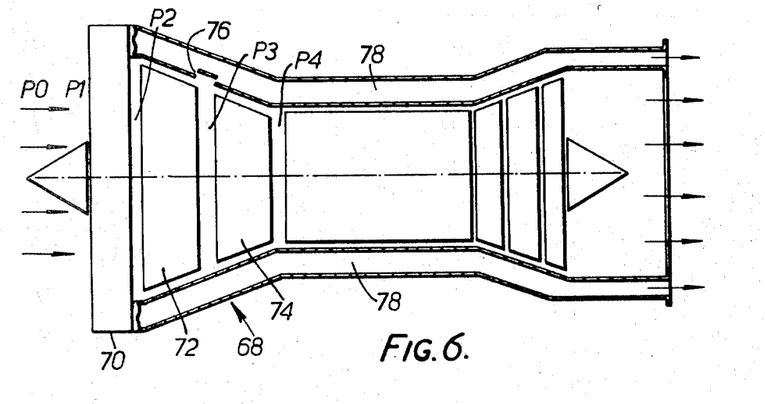
FIG. 6 shows a gas turbine incorporating a bleed valve in the compressor stage.

FIG. 6 shows a gas turbine engine having a bleed valve in the compressor stage. The compressor stage 68 includes a low pressure fan 70 which builds up a pressure of P2, an intermediate pressure compressor 72 which increases the pressure from P2 to P3 and a high pressure compressor 74 which brings the pressure up to a final level of P4. A by-pass flow chamber 78 is provided around the periphery of the compressor stage 68 which is fed by the low pressure fan 70. A bleed valve 76 is provided between the by-pass flow chamber 78 and the compression chamber at a position between the intermediate and high power compressors 72 and 74.

Thus if the pressure P4 starts to increase too rapidly it can be reduced by opening the bleed valve 76 to reduce the pressure P3 and thereby the pressure P4.

Figure 7:
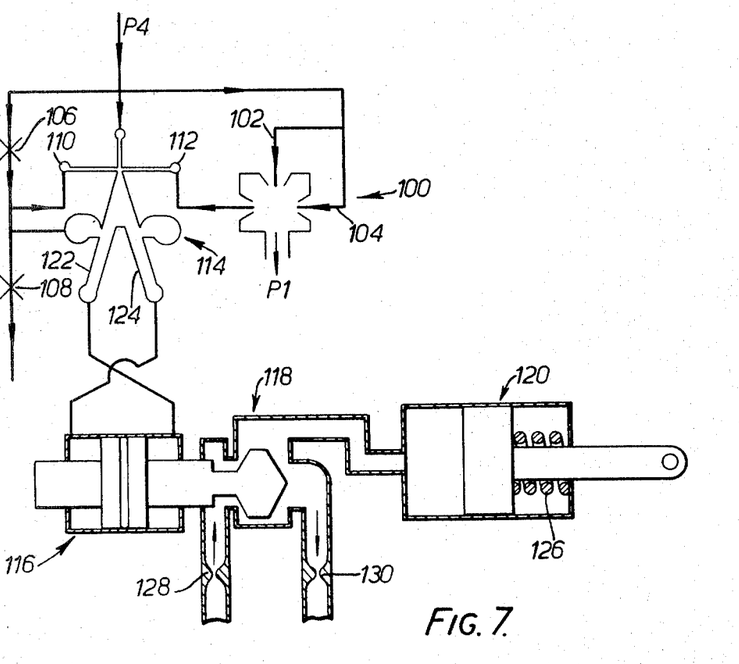
FIGS. 7 to 10 respectively show four fluidic position control systems as used for controlling the bleed valve of FIG. 6.

FIG. 7 shows a position control system for controlling the bleed valve 76 at FIG. 6 and will now be described.

The system of FIG. 7 differs from the system of FIGS. 1 and 3 in that the orifice 24 of FIGS. 1 and 3 is replaced by an orifice 108 which is fixed in area. Furthermore, the proportional amplifier 18 is replaced by a fluidic bistable element 114 and the planar jet collector 12 is replaced by a modified jet collector 100. The jet collector 100 has a supply jet input 104 and a control jet input 102 both supplied with the pressure P4. The fluidic bistable element 114 is capable of switching between two states in dependence upon the sense of the pressure difference existing across two control jet inputs 110 and 112, one control jet input 112 is connected to the output of the jet collector 106 while the other control jet input is connected to a tapping between the two orifices 106 and 108. The bistable element 114 is supplied with the pressure P4 and has two output legs 122 and 124 only one of which supplies fluid at any instant, the output leg which is to supply fluid is selected in dependence upon the sense of the pressure difference across the control jet inputs 110 and 112.

The output legs 122 and 124 supply fluid to a ram 116 (similar to that shown in FIG. 3). The ram 116 controls a two-way valve 118 which connects a piston and cylinder arrangement 120 either to a fluid source 128 or a fluid drain 130. The piston and cylinder arrangement 120 includes a spring 126 which urges the piston in a direction such that, when the piston and cylinder arrangement 120 is connected to the fluid drain 130 fluid is assisted from the cylinder by the piston.

The piston has a piston rod which controls operation of the beed valve 76 (see FIG. 6) which is in the form of a butterfly valve.

In operation, the jet collector 100 basically operates in a similar manner to the planar jet collector 12 of FIG. 1. However, the additional control jet input 102, which is supplied with only a small fraction of the fluid that is supplied to the input 104, interacts with the main fluid stream from the input 104 such that the main stream is given a slight deflection and this has been found to produce a more stable flow of fluid through the jet collector. As described in conjunction with FIG. 1, when there is a change in pressure P4 a pressure difference is set up between the output pressures of the jet collector 100 and the tapping of the two orifices 106 and 108. This pressure difference appears across the control jet inputs of the bistable element 114 which, dependent upon the sense of the pressure difference (i.e., positive or negative), will either not affect the state of the bistable element or will flip the bistable element into the other state.

When the bistable element 114 is in the first state it feeds fluid through the leg 124 to the ram 116 so that the valve 116 connects the source of supply 128 to the piston and cylinder arrangement 120 thus maintaining the bleed valve 76 in the closed position. As soon as the bistable element changes state, the leg 122 supplies fluid to the ram 116 to operate the valve 116 so as to prevent the supply source 128 communicating with the piston and cylinder arrangement 120 and to connect the piston and cylinder arrangement 120 with the fluid drain 130. The spring 126 thus forces all the fluid out of the piston and cylinder arrangement 120 and opens the bleed valve 76. Because the orifices 106, 108 have fixed areas and do not provide a feedback signal as in FIG. 1, the system of FIG. 8 acts in a simple ON/OFF mode and can be arranged to switch every time the pressure P4 rises above a predetermined value or alternatively every time the pressure P4 falls below the predetermined value.

The opening and closing speed of the butterfly valve 76 is limited by restrictions respectively mounted in the fluid source 128 and fluid drain 130 of the valve 118.

Figure 8:
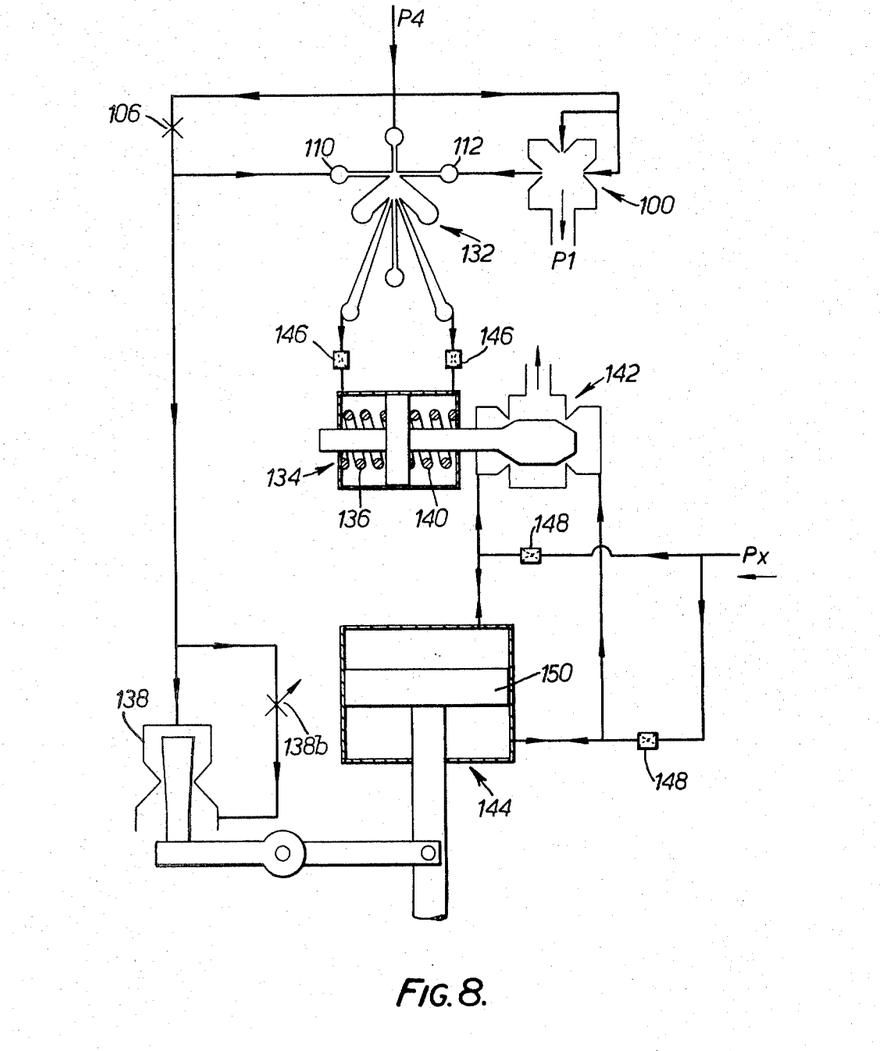

The system of FIG. 8 differs from that of FIG. 7 in that the bistable element 114 is replaced by a momentum interaction proportional element 132, and in that the fixed orifice 108 is replaced by a variable orifice 138 having a trim orifice 138b. Furthermore, the mechanical arrangement for actuating the bleed valve differs. The outputs from the tapping between the orifices 22, 138 and from the jet collector 100 are connected to control jet inputs 110 and 112 of the momentum interaction proportional element 132. The two output legs of the proportional element 132 are connected to a ram 134 which is similar to that shown in FIG. 8 but provided with springs 136 and 140 which bias the piston of the ram 134 into a central position. Restrictors 146 are provided between the legs of the proportional element 132 and the ram 134 to limit the rate of fluid flow to the ram. The piston rod of the ram controls a valve 142 which in turn controls the fluid flow from two inlets to an exhaust outlet.

A cylinder and piston assembly 144 includes a closed cylinder each end of which is supplied with fluid at a pressure Px from a source (not shown). Each end of the cylinder also communicates with a respective inlet of the valve 142. A restrictor 148 is provided in each of the feed lines to the cylinder to limit the rate of flow of fluid to the cylinder. The piston of the cylinder and piston assembly 144 is connected to the bleed valve 76 (see FIG. 6) in the form of a butterfly valve (not shown).

The piston rod is also linked to the variable orifice 138 so as to vary the area of the orifice with movement of the piston. The variable trim orifice 138b can be adjusted to vary the datum operating position of the orifice 138.

As described hereinbefore, when the pressure P4 increases a pressure difference arises across the control jet inputs 110 and 112 of the proportional element 132. This pressure difference causes more fluid to flow through the right hand leg of the proportional element than the other leg and therefore the piston of the ram 134 is urged away from its normal position and moves to the left (as viewed in FIG. 9). Movement of the ram in turn operates the valve 142 so that more fluid exits from one side of the cylinder and piston assembly 144 than the other and this cuases the piston of the piston and cylinder assembly to become displaced by the pressure Px and operate the bleed valve 76 in a sense such as to reduce the pressure P4. At the same time the piston also adjusts the variable orifice 138 to increase its area. This increase in area results in a decrease in pressure at the control jet inlet 110 thereby reducing the pressure difference across the proportional element 132. This decrease in pressure difference ultimately causes the piston of the piston and cylinder assembly 144 to halt when equilibrium is eventually reached.

It will be appreciated that appropriate shaping of the seats of the valve 142 can improve the transient response of the closed loop system.

Figure 9:
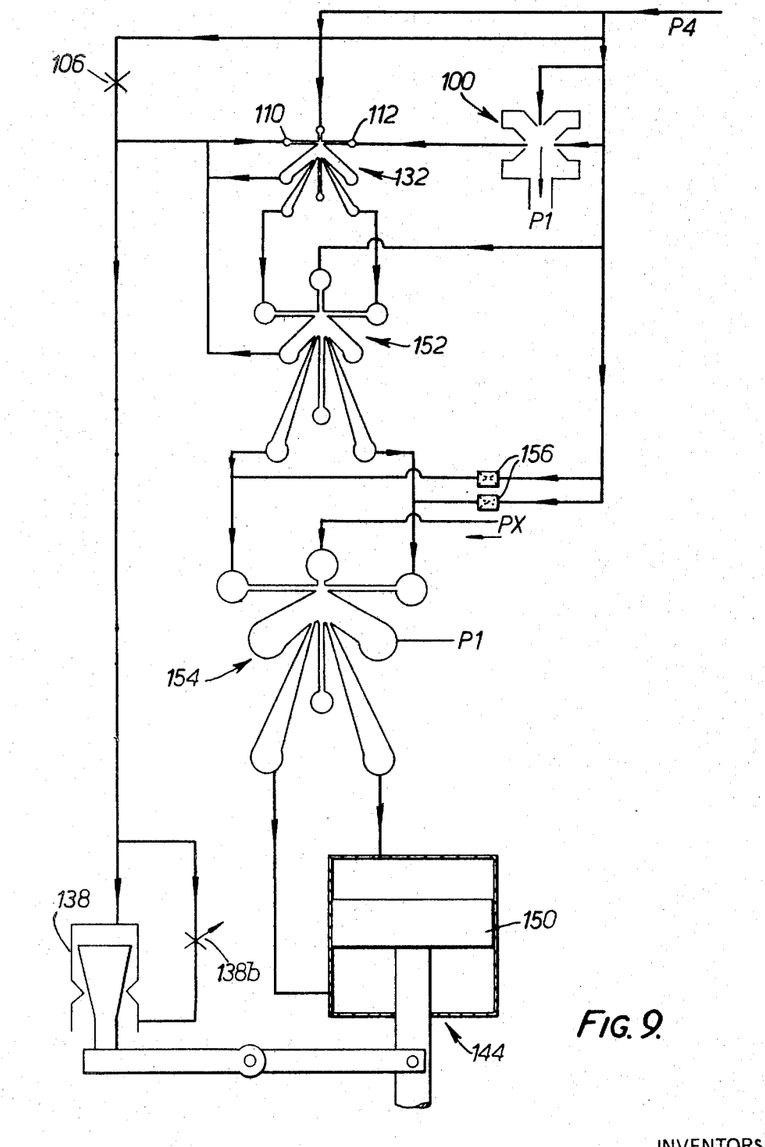

FIG. 9 shows a further position control system for controlling the bleed valve of FIG. 6. FIG. 9 is in fact a modification of FIG. 8 and parts similar to those in FIG. 8 are similarly referenced. In this embodiment, the output legs of the proportional element 132, instead of feeding a ram (as in FIG. 9), feed two further proportional elements 152 and 154 connected in cascade with the first proportional element 132 to form a three stage amplifier. The fluid flow to the control jet inputs of the third stage, proportional element 154, is supplemented by a restricted flow of fluid direct from the source of the pressure P4, the flow being restricted by restrictors 156.

The output legs of the proportional element 154 feed the piston and cylinder arrangement 144 direct, the element 154 being supplied with the pressure Px, and thereby controls the bleed valve 76 (not shown). As in FIG. 9, the piston 150 of the piston and cylinder arrangement 144 of FIG. 10 also controls the area of the orifice 138.

Figure 10:
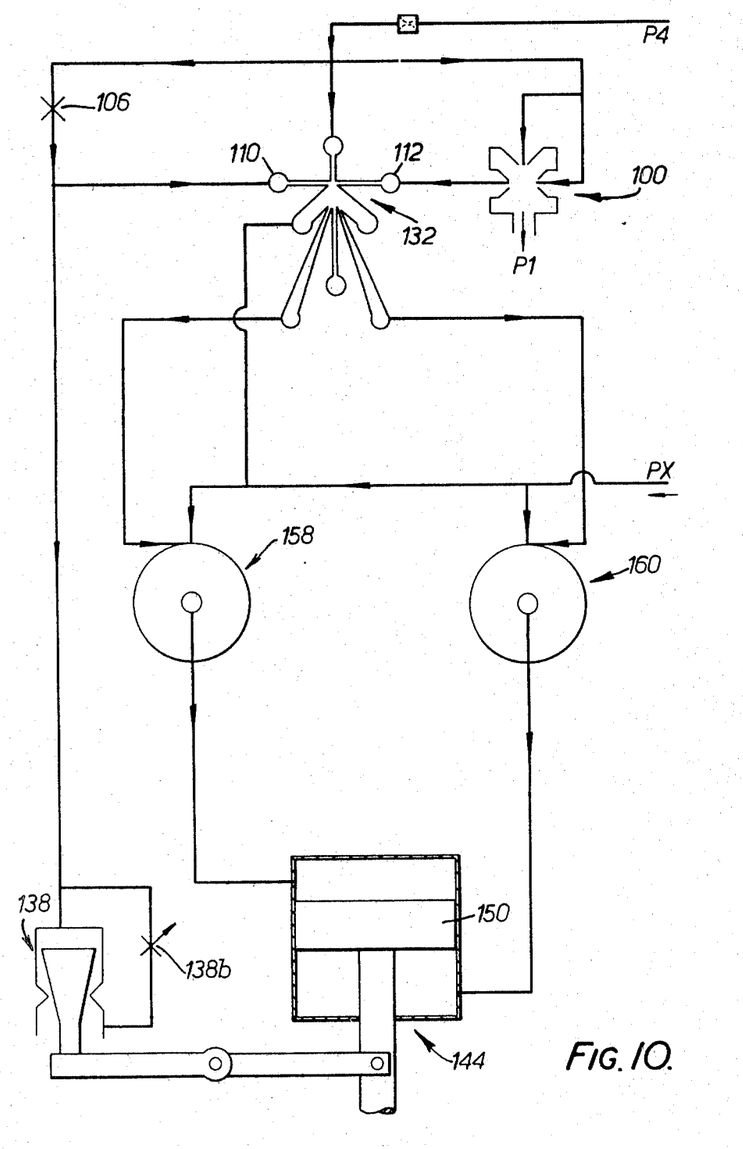

The operation of the system of FIG. 10 is similar to that described in conjunction with FIG. 8 but instead of the ram and valve controlling the operation of the piston and cylinder arrangement 144 it is done directly through two stages of amplification.

FIG. 10 shows yet a further position control system for controlling the bleed valve of FIG. 6. FIG. 10 is in fact another modification of FIG. 8 and those parts similar to those in FIG. 8 are similarly referenced.

Here, as in FIG. 9, the ram 134 and valve 142 of the FIG. 9 arrangement have been replaced by a fluid amplifier which drives a piston and cylinder assembly 144 directly. In this case, the fluid amplifier comprises two vortex amplifiers 158 and 160 working in a Push/Pull mode. The control jet input of each vortex amplifier is served by a corresponding output leg of the proportional element 132 and the supply jet input of each vortex amplifier is fed by pressure Px. The two outputs of the vortex amplifiers 158, 160 are connected across the cylinder and piston arrangement 144 to drive the piston 150 in dependence upon the pressure difference therebetween.

The operation of the system is similar to that described in connection with FIG. 10.

Advantageously the output from each vortex amplifier is collected in a pilot type receiver probe positioned axially to the chamber with a predetermined gap between the orifice and the receiver. This arrangement gives a high turn down ratio and produces a high pressure difference across the piston and cylinder arrangement 144.

We claim:

1. A fluidic position control system, comprising
a pressure ratio sensor having an input and output, said jet converter providing a pressure drop to a stream of fluid from the fluid source passing therethrough such that the ratio of input to output pressure thereacross varies as a function of input pressure,
reference means having an input and output, said reference means providing an output pressure which is a fraction of the input pressure applied thereto,
a source of fluid,
means connecting the inputs of the pressure ratio sensor and the reference means to the source of fluid,
control means having two control inputs respectively connected to the outputs of the pressure ratio sensor and the reference means to provide an output in dependence upon the difference, if any between the output pressures of said pressure ratio sensor and said reference means, and
feedback means connected between said control means and said reference means for varying the pressure drop across said reference means to tend to reduce said pressure difference to zero.

2. A system according to claim 1, wherein said feedback means is operable to vary the value of the fraction produced by said reference means.

3. A system according to claim 1, wherein the control means comprises a fluidic proportional amplifier having a vent output and the system includes means connected to the vent output to determine the pressure at the vent output and thereby to adjust the input/output pressure ratio across the proportional amplifier.

4. A system according to claim 1, wherein the reference means comprises
a fixed area orifice,
a variable area orifice, and
tapping means connecting the two orifices in series and having an output which forms the output from the reference means.

5. A system according to claim 1, wherein the reference means comprises first and second fixed area orifices, means connecting the two orifices in series and forming the output of the reference means.

6. A system according to claim 1, wherein said control means comprises
a bistable fluidic element capable of adopting one or other of two states in dependence upon the polarity of the pressure difference between the reference means and the pressure ratio sensor,
a fluid control valve and an actuator connected between the output of the control means and the fluid control valve to open and close the valve in response to the state of the bistable fluidic element.

7. A fluidic position control system, comprising
a pressure ratio sensor having an input and output, said pressure ratio sensor providing a pressure drop to a stream of fluid from the fluid source passing therethrough such that the ratio of input to output pressure thereacross varies as a function of input pressure,
a fluidic proportional amplifier having two control inputs and a vent output,
means connected to the vent output of the amplifier to determine the pressure at the vent output and thereby to adjust the input/output pressure ratio across the proportional amplifier,
reference means comprising
first means having an input and output and providing an output pressure which is a fraction of the input pressure applied to the input,
a vortex diode,
a fluid capacitor, and
second means connecting the diode and capacitor in series between the output of the first means and a corresponding control input of the proportional amplifier to vary the transient response of the system in dependence upon the direction in which the pressure applied to the reference means is changing,
a source of fluid,
means connecting the inputs of the pressure ratio sensor and the reference means to the source of fluid, means connecting the two control inputs of the fluidic amplifier respectively to the outputs of the pressure ratio sensor and the reference means to provide an output in dependence upon the difference, if any, between the output pressures of said pressure ratio sensor and said reference means.

* * * * *